June 9, 1925.
K. PIESCH
SPRING WHEEL
Filed March 7, 1924
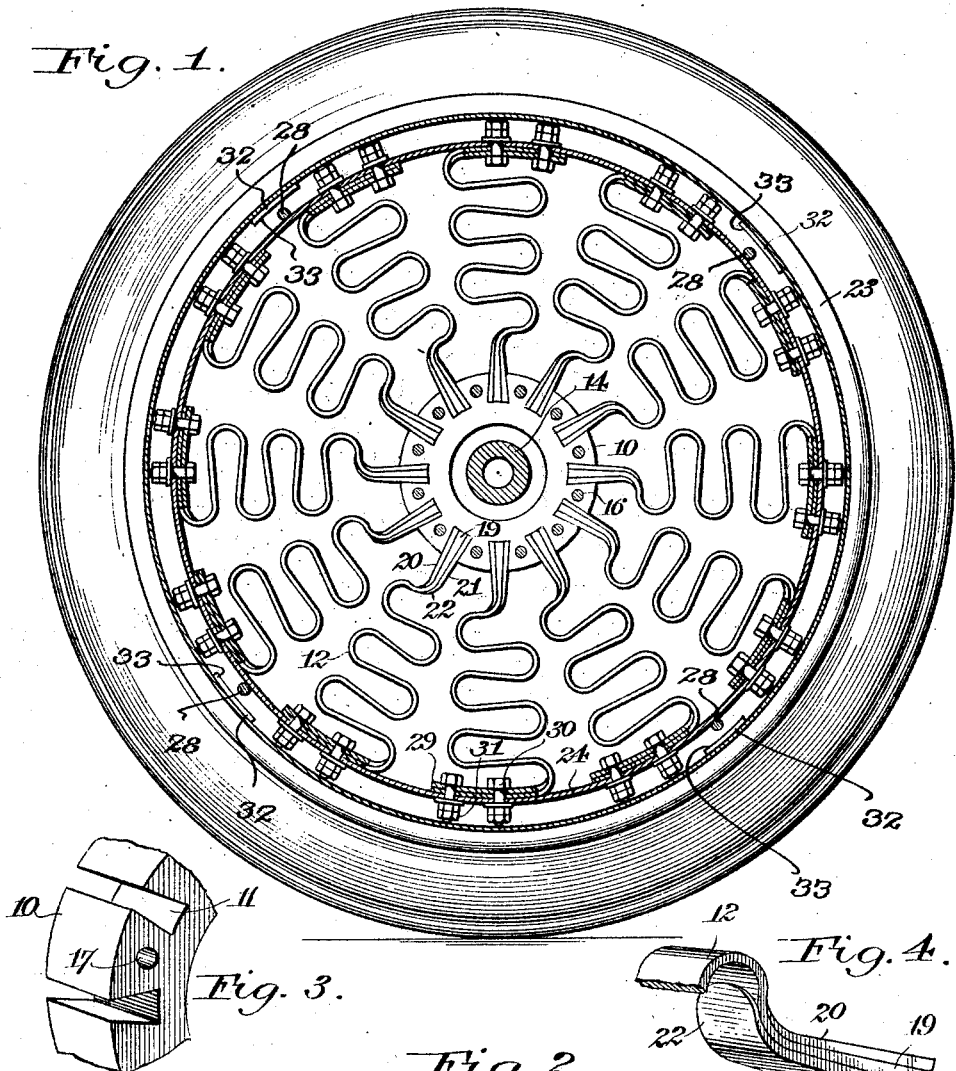
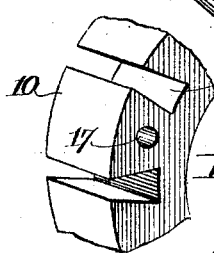
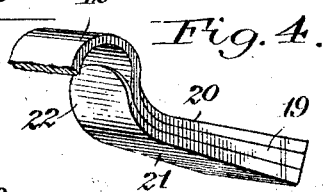
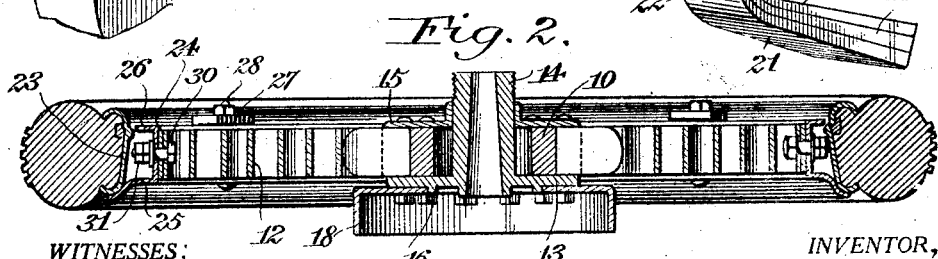
WITNESSES:
INVENTOR,
Karl Piesch.
BY
ATTORNEYS.

Patented June 9, 1925.

1,541,739

UNITED STATES PATENT OFFICE.

KARL PIESCH, OF NEW ORLEANS, LOUISIANA.

SPRING WHEEL.

Application filed March 7, 1924. Serial No. 697,605.

*To all whom it may concern:*

Be it known that I, KARL PIESCH, a citizen of the United States of America, and a resident of New Orleans, parish of Orleans, and State of Louisiana, have invented a new and Improved Spring Wheel, of which the following is a description.

My invention relates to a spring wheel and particularly to a wheel in which spring elements are radially disposed and connected at their inner ends with the wheel hub and at their outer ends with a wheel rim.

The general object of my invention is to provide a wheel of the indicated type improved in various particulars especially with respect to the spring elements having in view to embody therein the maximum strength and to provide a novel rim assemblage having in view the convenience of assembling and disassembling the parts.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a partly sectional side elevation of a spring wheel embodying my invention;

Figure 2 is a horizontal section thereof;

Figure 3 is a fragmentary perspective view showing a portion of the hub;

Figure 4 is a perspective view of the inner end of one of the spring elements.

In carrying out my invention in accordance with the illustrated example I provide a hub assemblage comprising a ring 10 having transverse dove-tail slots 11 therein at the periphery to receive the ends of springs 12 disposed generally in radial positions about the hub. The hub assemblage comprises further a flange 13 having a laterally disposed axial box or bearing 14 integral with said flange 13, said hub box being centrally disposed within the ring 10. A second, separate, flange 15 fits over the box 14, said flanges 13, 15 being disposed respectively at opposite sides of the hub ring 10. Transverse bolts 16 pass through the flanges 13, 15 and through bolt holes 17 in the hub ring 10. Thus, the described hub assemblage constitutes a rigid unit. The numeral 18 indicates a brake drum which is held to the flange 13 by the bolts 16.

The inner ends of the springs 12 are given a formation to conform to the dove-tail slots 11 for which purpose said springs are made up of a series of tapering leaves, the central one 19 of which is integral with the spring 12 and the inner and outer laminations 20 and 21 are separate members, the whole being welded together to form a dove-tail terminal. Each spring 12 is bent laterally alternately in opposite directions to give the spring a zig-zag form between the inner and outer ends thereof to give maximum resiliency and at the first bend adjacent the dove-tail inner end of the spring one lamination 21 at said end has a terminal 22 extending partially into said first bend to strengthen the spring at the outer terminal of said dove-tail portion of the spring.

At the outer ends of the springs a wheel rim assemblage is provided adapted to receive the tire rim 23. The wheel rim 24 is of general channel-form cross section being formed with flanges 25, 26, the one extending radially outward beyond the other, the flanges forming a seat for the demountable tire rim 23. The demountable rim 23 is disposed against a longer flange 25 on the wheel rim 24 and at the opposite side of the wheel lugs 27 are provided secured by bolts 28 and engaging the rim 23 to retain the same in position on the wheel. The outer ends of the springs 12 are thickened by an additional lamination 29 and said thickened terminals bear against the inner surface of the ring 24 so that said thickened portions are disposed in an annular series about the inner side of said rim 24. The outer ends of the springs are secured by bolts 30 passing through said thickened portions 29 and through the wheel rim 24, said bolts being provided with nuts 31. The outer ends of the bolts 30 and the nuts 31 are accommodated in the space between the wheel rim 24 and the demountable tire rim 23.

The lugs 27 present laterally disposed members 32 and said member 32 of each lug is received in a cut-out 33 in the adjacent flange of the channel rim 24.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

In a spring wheel, a hub having a ring element formed with transverse dove-tail grooves at the periphery, a rim, radially disposed springs between said hub and rim, said springs having zig-zag bends and the spring inward of the innermost bend having a plurality of laminations, one of which laminations follows the line of the adjacent bends of the springs.

KARL PIESCH.